March 21, 1961  J. D. KEITHAHN  2,975,837
FRICTION DRAG DEVICES
Filed May 19, 1958  3 Sheets-Sheet 1

INVENTOR.
JULIAN D. KEITHAHN
BY
Mellin and Hanscom
ATTORNEYS.

March 21, 1961  J. D. KEITHAHN  2,975,837
FRICTION DRAG DEVICES
Filed May 19, 1958  3 Sheets-Sheet 2
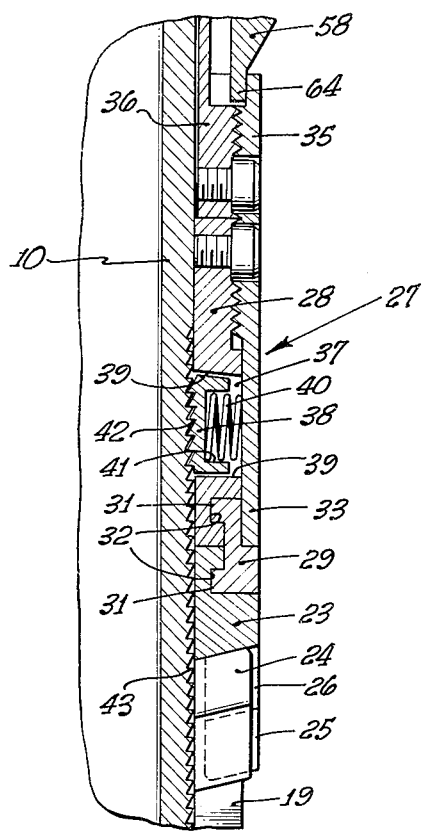
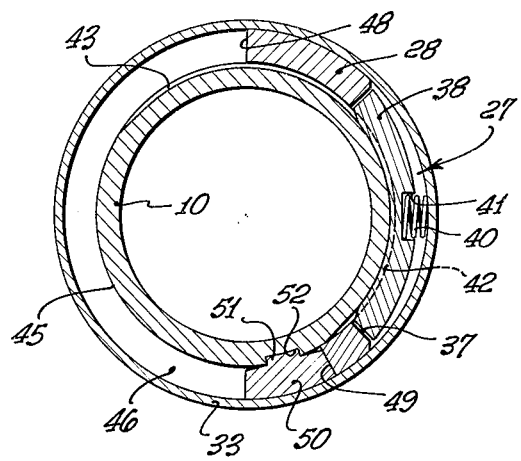
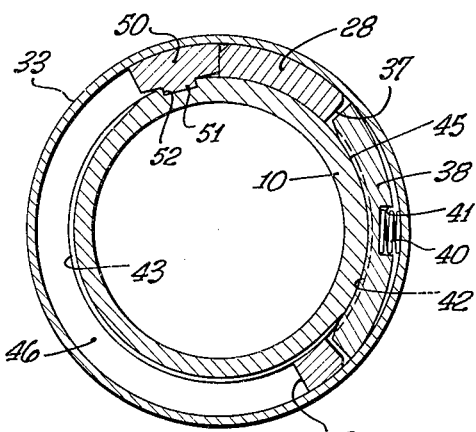
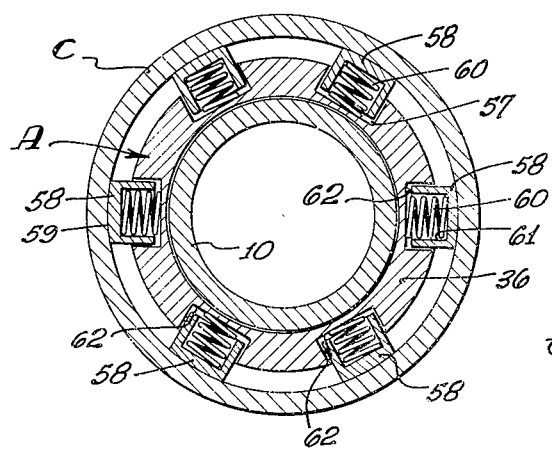
INVENTOR.
JULIAN D. KEITHAHN
BY
Mellin and Hanscom
ATTORNEYS.

March 21, 1961 J. D. KEITHAHN 2,975,837
FRICTION DRAG DEVICES
Filed May 19, 1958 3 Sheets-Sheet 3
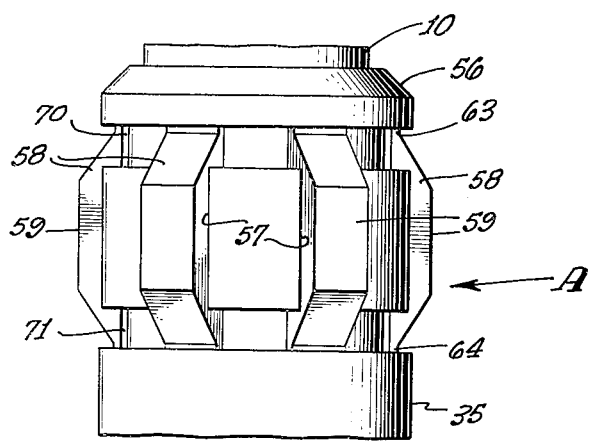
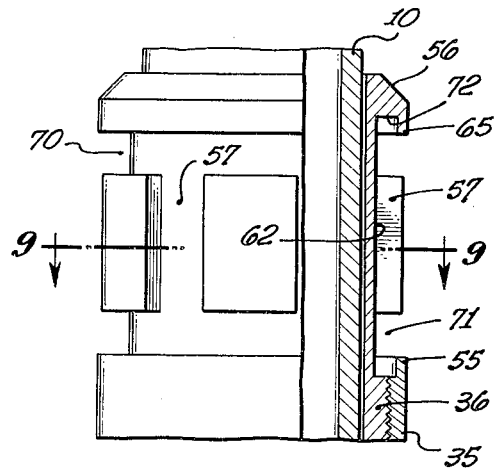
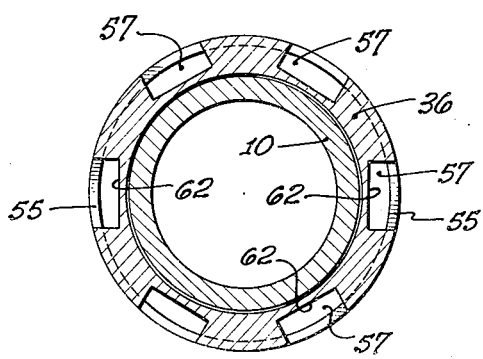
INVENTOR.
JULIAN D. KEITHAHN
BY
Meelin and Hanson
ATTORNEYS

United States Patent Office 2,975,837
Patented Mar. 21, 1961

2,975,837

FRICTION DRAG DEVICES

Julian D. Keithahn, Anaheim, Calif., assignor to Baker Oil Tools, Inc., Los Angeles, Calif., a corporation of California Filed May 19, 1958, Ser. No. 736,138

4 Claims. (Cl. 166—241)

The present invention relates to subsurface well bore equipment, and more particularly to friction drag devices adapted to frictionally engage the walls of well casings, and similar conduits, disposed in well bores to resist or prevent movement of well apparatus therewithin.

An object of this invention is to provide a friction drag device embodying circumferentially spaced drag elements, the device consisting of relatively few parts, and being easy to assemble and dismantle.

Another object of the invention is to provide a friction drag device embodying circumferentially spaced drag elements, the device being more economical to manufacture.

A further object of the invention is to provide a friction drag device embodying circumferentially spaced drag elements slidable radially in grooves, the grooves being provided in a more facile and economical manner.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Fig. 3 is an enlarged fragmentary longitudinal section through a portion of the apparatus;

Fig. 4 is an enlarged cross-section taken along the line 4—4 on Fig. 1;

Fig. 5 is an enlarged cross-section taken along the line 5—5 on Fig. 2;

Fig. 6 is a cross-section taken along the line 6—6 on Fig. 2;

Fig. 7 is a side elevational view of the drag portion of the apparatus;

Fig. 8 is a combined side elevational view and longitudinal section through the drag portion of the apparatus with the drag blocks removed;

Fig. 9 is a cross-section taken along the line 9—9 on Fig. 8.

Figure 1:
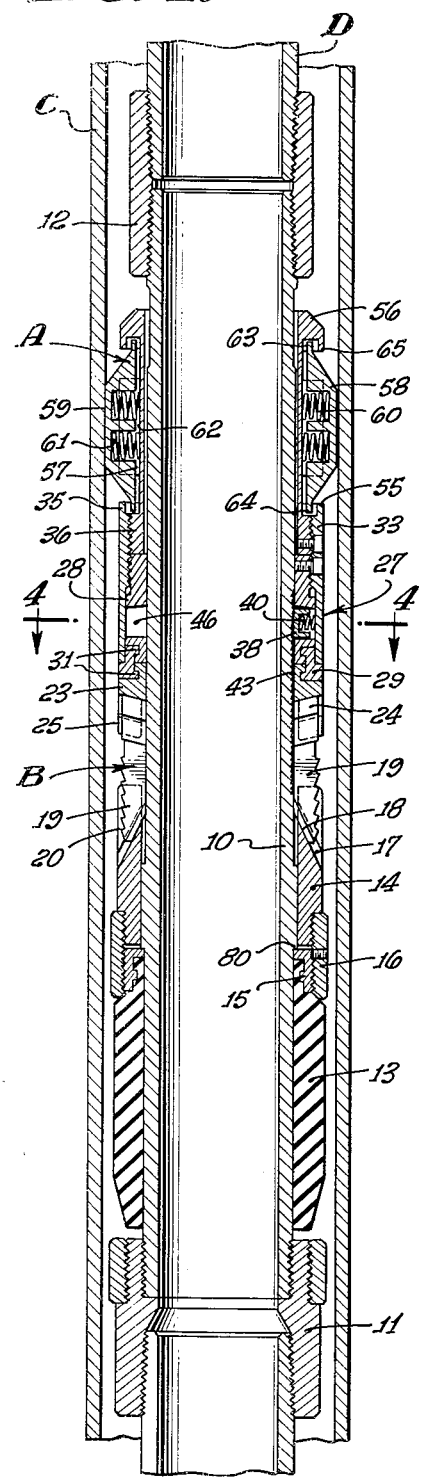
Figure 1 is a longitudinal section through the apparatus, with its parts in retracted position.
Figure 2:
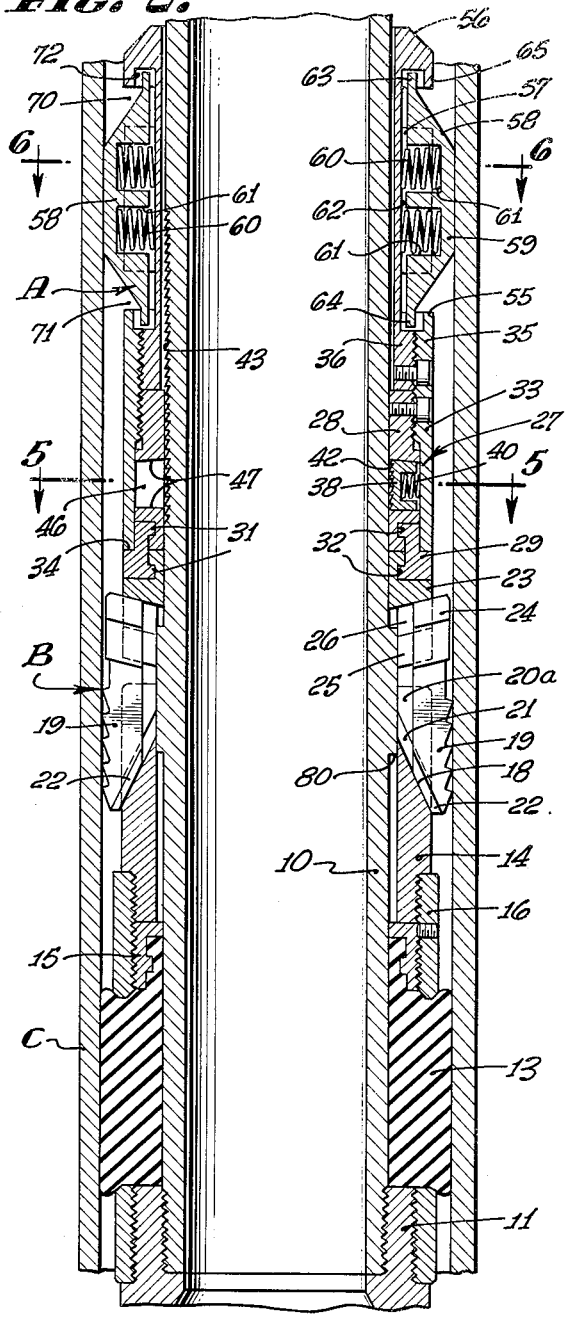
Fig. 2 is an enlarged longitudinal section through the apparatus shown in Fig. 1, with certain parts expanded against the well casing.

The friction drag device A is illustrated in the drawings as forming part of a well packer B, in order to provide an exemplification of one use of the device. This well packer is adapted to the anchored in packed-up condition in a well casing C, being movable through the latter by means of a tubular string D, such as tubing or drill pipe, extending to the top of the well bore. It is to be understood, however, that the friction drag device A can be used in other relationships than the one specifically illustrated.

The well packer B shown in the drawings includes a tubular body 10, the lower end of which is threadedly attached to a lower body guide 11, and the upper end of which is threadedly attached to an upper body coupling 12, which is, in turn, threadedly secured to the lower end of the tubing string D that extends to the top of the well bore. Surrounding the body 10 of the tool is a packing structure 13, such as a rubber or rubber-like packing sleeve, the lower end of which is adapted to engage the upper end of the guide 11, and the upper end of which is secured to an expander 14 slidably mounted on the body of the tool. Any suitable mode of attachment may be used. As shown, an end ring 15 is molded to the upper portion of the packing sleeve 13, this ring being threaded within a coupling sleeve 16 threadedly secured to the lower portion of the expander, 14.

The expander 14 has a plurality of circumferentially spaced expander surfaces 17 which are inclined in an upward and inward direction for engagement with companion tapered inner surfaces 18 on a set of circumferentially spaced slips 19 shiftable relative to the body 10 of the tool. These slips 19 have external wickers 20 facing in an upward direction to embed themselves in the wall of the well casing C when the expander 14 moves upwardly relative to the slips to expand the latter outwardly. To secure retraction of the slips 19 upon relative downward movement of the expander 14 with respect thereto, the slips are each interconnected to the expander by a slidable tapered spline connection. As specifically shown the slips are mounted in slots 20a in the expander 14, the expander having inclined grooves 21 at the sides of each slot receiving inclined tongues 22 projecting from opposite sides of each slip. Thus, upon relative downward movement of the expander 14 with respect to the slips 19, after the latter have occupied an outward expanded position, the tongue and grooves connection 22, 21 will result in a positive inward shifting of the slips, to place them in their retracted position.

The slips 19 are coupled together for joint movement by being secured to a slip ring 23, the slips, however, being shifted radially with respect to the ring. Such coupling and radial shifting is secured by forming the upper portions of the slips as T-shaped heads 24 shiftable within lower slots 25 within the slip ring 23, the upper portion of each head being slidable radially within the grooves 26 opening into the sides of each slot 25.

The slip ring 23 is coupled to a clutch or lock device 27 which will determine the ability of the body 10 of the tool to move longitudinally relative to the slip ring 23 and the slips 19 themselves. The clutch device includes a clutch or control sleeve 28 coupled to the slip ring by a two-piece tie ring 29 having upper and lower flanges 31 received within upper and lower grooves 32 in the slip ring 23 and the clutch sleeve 28. This tie ring is held in assembled position by a clutch housing 33, the lower portion of which rests upon a shoulder 34 on the tie ring and encompasses the upper part of the latter. This clutch housing has an upper threaded portion 35 threadedly secured to the upper part of the clutch sleeve 28 and also threadedly secured to the lower end of the drag body 36 of the drag device A surrounding the packer body 10.

The clutch sleeve has an arcuate opening 37 therethrough in which a clutch segment or dog 38 is disposed that is capable of shifting radially of the sleeve 28, being confined in such shifting movement by the upper and lower sides 39 of the opening. The clutch dog 38 is shiftable inwardly by a helical compression spring 40, the outer end of which engages the housing 33 and the inner end of which is disposed within a dog socket 41, engaging the inner portion of the latter. The clutch segment 38 is urged inwardly to place its internal downwardly facing ratchet teeth 42 into engagement with companion upwardly facing ratchet teeth 43, provided on the packer body 10, to prevent the body from moving upwardly relative to the clutch segment whenever the teeth are coengaged. The body teeth 43 extend a substantial distance along the body of the tool, so that the body can occupy a plurality of positions within the clutch sleeve 28 and clutch housing 33 and yet become coupled to the dog 38. The body 10 can shift downwardly freely, ratcheting along the clutch dog 38.

The clutch dog 38 is releasable from the body clutch teeth 43 whenever the body 10 is to be moved upwardly within the clutch sleeve 28 and the clutch housing 33. It will be noted that the body ratchet teeth 43 extend only partially around the packer body 10. Between the arcuate ends of the body ratchet teeth, the packer body has a smooth or uninterrupted surface 45. Such smooth portion may be considered to be a cam portion 45, the purpose of which is to cam or shift the clutch segment 38 radially outwardly and enable the body 10 to move longitudinally in both directions within the clutch segment or dog 38, the clutch sleeve 28 and the surrounding housing 33. Assuming the ratchet teeth 42, 43 to be coengaged, the clutch dog 38 can be released from the body ratchet teeth 43 by turning the body 10 of the packer to the right, or in a clockwise direction, until the cam portion 45 of the body engages the clutch segment 38 and shifts it radially outward and holds it in such radial outward position. Relative rotation of the body 10 to the left, or in a counter clockwise direction, will again place the racthet teeth 43 in position to be engaged by the companion inner teeth 42 on the clutch segment 38, whereupon the clutch is in the engaged position.

The location of the body ratchet teeth 43 in engagement with the clutch segment 38 or the cam portion 45 in engagement with the clutch segment is determined positively. Thus, the clutch sleeve 28 has another extended arcuate opening 46, this opening having upper and lower sides 47 and terminating at stop shoulders 48, 49 provided by the stop sleeve. A key 50 is shiftable arcuately in the opening 46, this key having an inner projection 51 slidably received within a longitudinally extending keyway 52 in the packer body 10 to one side of its ratchet teeth 43. As disclosed most clearly in Fig. 4, when the body 10 has been turned to the left to place the key 50 in engagement with one of the sleeves stop shoulders 49, the body ratchet teeth 43 are disposed opposite the clutch segments 38, whereupon clutching engagement between the teeth can occur. Rotation of the body 10 in a clockwise direction will shift the key 50 arcuately in the same direction until it engages the other stop shoulder 48 at the other end of the opening 46, whereupon the cam portion 45 will be disposed in confronting relation to the clutch segment 38, insuring that the clutch segment has been shifted radially outward and is not in clutching position with respect to the body ratchet teeth 43. The body 10 can be turned to shift the key 50 between its positions of engagement against one stop shoulder or the other stop shoulder for different longitudinal positions of the body with respect to the clutch structure surrounding it. Such action is permitted because of the longitudinal extent of the groove 52 in which the inner portion 51 of the key 50 is disposed.

The ability of the clutch mechanism to be placed in its clutching or unclutching position is dependent upon the resistance to turning of the clutch sleeve 28 and housing 33 provided by the drag device A. Such drag device has the further purpose of resisting longitudinal movement of portions of the packer apparatus, such as the slip structure 23, 19, with respect to the body 10 of the tool, in order that the slips and packing 13 can be engaged with the well casing or released therefrom. The drag device A includes the drag body 36 which is slidably mounted upon and with respect to the packer body 10. As stated above, the lower portion of this drag body 36 is threadedly secured to the clutch housing 33, the upper part 55 of which may be considered as constituting a stop member or rim. The upper end 56 of the drag body may be tapered in upward and inward direction to prevent the body 36 from hanging up on restrictions or coupling spaces in the well casing C while being moved upwardly therein. Between its upper and lower portions the drag body has a plurality of circumferentially spaced and longitudinally extending grooves 57, in each of which a drag block 58 is disposed and is radially slidable, the sides of the blocks being slidable along the sides of the grooves 57. Each drag block 58 has a central longitudinal portion 59 adapted to frictionally bear against the wall of the well casing C, being urged outwardly against the well casing by a plurality of helical compression springs 60 disposed within sockets 61 in the central drag block portion, which is located within the longitudinal groove 57, the inner ends of the springs 60 bearing against the base 62 of the groove 57 and its outer end against the bases of the sockets.

From its central longitudinal portion 59 each drag block tapers in an upward and inward direction, terminating in an upper stop member or terminal 63. Similarly, each drag block tapers from its central friction drag portion in a downward and inward direction terminating in a lower stop terminal 64. The upper stop terminal 63 is adapted to engage an upper stop rim or ring portion 65 of the drag body 36 and the lower stop terminal 64 is adapted to engage the lower stop rim or ring 55 provided by the upper end of the stop sleeve or clutch housing 33. The engagement of the terminals 63, 64 with the stop rims 65, 55 limits the extent of outward movement of each drag block 58 under the influence of the springs 60. When the apparatus is disposed within a well casing C, the drag blocks are shifted inwardly against the compressive force of the springs 60, to locate the stop terminals 63, 64 inwardly and away from the upper and lower stop rims 65, 55.

It is to be noted that the central longitudinal grooves 57 do not extend the full distance between the upper and lower stop rims 65, 55, but terminate a substantial distance therefrom. Thus, the upper ends of the longitudinal grooves open into an upper circumferentially continuous groove 70; whereas the lower ends of the longitudinal grooves 57 open into a lower circumferentially continuous groove 71. These upper and lower grooves 70, 71 may be turned in a lathe in a very rapid manner, the upper groove 70 merging into an upper circumferential recess 72 in which the upper stop terminal 63 is located. The cutting of the upper circumferential groove 70 in a lathe can be followed by turning the circumferential recess 72 in the lathe, in order to provide a space for the stop terminals 63 and produce the upper stop rim or ring 65, which is integral with the drag body 36.

The provision of the circumferential grooves 70, 71 in the drag body 36 facilitates its manufacture and minimizes the number of parts of the entire friction drag block device A. In the manufacture of the drag body 36, the upper and lower circumferential grooves 70, 71 and the undercut recess 72 are first produced in a lathe, the central portion of the body remaining between the upper and lower circumferential grooves, each of which has an extended length. Each longitudinal groove 57 can then be cut very readily, as by using a milling cutter of the proper diameter, which, for example, will fit within the lower circumferential groove 71 to its base 62, and which can be shifted relatively along the body 36 toward the other groove 70 to form a longitudinal groove 57, the milling cutter moving into the upper circumferential groove 70. All of the longitudinal grooves 57 can thus be formed by a milling cutter in a very simple and rapid manner. The grooves 57 could also be produced by other machine tools, as, for example, by use of a shaper which would be moved lengthwise in the body 36, the shaper cutter running from one of the circumferential grooves 70 into the other circumferential groove 71 to produce each intervening longitudinal groove 57.

The aforenoted simple manner of providing longitudinal grooves 57 is to be contrasted with prior formation of longitudinal grooves that extended from one stop portion 65 of the apparatus to the other stop portion 55 of the apparatus. A milling cutter could be used to form substantially the entire length of the longitudinal groove. It was then, however, necessary to use a different tool and operation to produce the ends of each groove. In lieu of the upper stop 65 being made integral with the body 36, as illustrated in the drawings, a separate stop rim or ring was required to be secured to the body in any feasible manner, as by welding it thereto or threading it thereon.

Following production of the drag body 36, including the stop 65, the drag blocks 58 with the coil springs 60 inserted in their sockets 61 are placed in the grooves 57, extending across the circumferential grooves 70, 71. The upper stop terminals 63 are slipped within the circumferential recess 72 and the blocks pressed inwardly to compress the springs 60 and place the lower stop terminals 64 inwardly of the body 36. The stop sleeve portion 55 is then threaded on the lower portion of the body 36 and the drag blocks released, the springs 60 urging them outwardly to the maximum extent determined by engagement of the stop terminals 63, 64 with the upper and lower stop rims 65, 55.

In the use of the apparatus specifically illustrated in the drawings, the packing sleeve 13 and slips 19 initially occupy their retracted positions, the body 10 being disposed relatively downward of the parts that surround it, and with the upper portion of its ratchet teeth 43 disposed opposite the clutch dog or segment 38. The apparatus is now inserted in the well casing C and is lowered downwardly therethrough by means of the tubular string D. During such downward movement the ratchet teeth 42, 43 need not necessarily be in a position to coengage, inasmuch as downward shifting of the body 10 tends to retain the packing sleeve 13 and the slips 19 in their retracted positions. However, as a precaution, it may be desirable for the ratchet teeth to be disposed opposite the clutch segment as determined by engagement of the key 50 with the stop shoulder 49. Accordingly, if the body 10 of the packer were to be shifted upwardly inadvertently to a substantial extent, the slips 19 and packing 13 would not be expanded against the well casing C. Upon insertion of the apparatus in the well casing, the drag blocks 58 are forced inwardly of the body 36 against the action of the springs 60, being guided in such movement by the side walls of the longitudinal grooves 57.

The apparatus is now lowered in the well casing, a shoulder 80 on the packer body 10 engaging the ring 15 to force the expander 14 downwardly, such downward movement of the expander being transmitted through the tongue and groove connection 22, 21 to the slips 19, which are in a retracted position, pulling the latter downwardly, which, in turn, exert a pull upon the slip ring 23, clutch sleeve 28, the clutch housing 33 and in the drag body 36, which will force the drag blocks 58 downwardly along the wall of the well casing C, the drag blocks sliding frictionally along such wall. When the location in the casing is reached at which the packer is to be set, the tubular string D and body 10 are turned in a right hand direction. In view of the frictional resistance to turning offered by the drag blocks 58 against the well casing C, the drag body 36, clutch housing 33 and clutch sleeve 28 are prevented from turning, the body 10 turning until its cam portion 45 engages the clutch segment 38 and shifts it in a radial outward direction against the force of the segment spring 40. The body will turn until its key 50 engages the other stop shoulder 48, which definitely locates the entire smooth cam portion 45 opposite the clutch segment 38, which is the unclutching position of the apparatus.

With the parts in such position, the tubing string D and the packer body 10 are now elevated, the frictional engagement of the drag blocks 58 against the well casing resisting and preventing upward movement of the parts that surround the body 10. Upward movement of the body will first engage the lower guide or abutment 11 with the lower end of the packing sleeve 13, shifting the latter upwardly, which will also shift the expander 14 upwardly within the slips 19, the latter being prevented from moving upwardly by being coupled to the drag assembly A. Upward movement of the expander 14 will occur to the extent at which it expands the slips 19 outwardly into anchoring engagement with the well casing C. A continuation of the upward movement of the body 10 will now move the lower abutment 11 toward the expander 14 or upper abutment, to shorten the packing sleeve 13 and compress it into sealing engagement with the wall of the well casing C. The well packer has now been anchored in packed-off position with the well casing C, so that fluid under pressure can now be pumped down through the tubular string D and the packer body 10 for the performance of the desired operation in the well bore. The pressure below the apparatus will act upwardly on the packing structure 13 tending to seal it more firmly against the wall of the well casing C, and also exerting an upward force on the expander 14 to wedge it more firmly behind the slips 19 to embed their wickers in the casing, thereby insuring against upward shifting of the packer in the well casing by the hydraulic forces acting thereon from below.

When the packer parts are to be retracted, all that is necessary to do is to shift the tubing string D and body 10 downwardly. The friction drag assembly A engages the wall of the well casing C to resist downward movement of the clutch mechanism surrounding the body 10 and the slip 19. Accordingly, the body 10 will move downwardly to shift the lower abutment 11 away from the expander 14 allowing the packing structure 13 to retract inherently to its initial position. The body shoulder 80 will then engage the ring 15 attached to the expander 14 through the threaded coupling 16, to move the expander 14 downwardly relative to the slips 19, downward movement of the latter still being resisted by the friction of the drag block device A against the casing C. In view of the tongue and groove connection between the expander 14 and slips 19, the slips are shifted to their retracted position.

The body 10 of the tool can now be turned to the left, to dispose its ratchet teeth 43 once again opposite the clutch segment 38, as determined by engagement of the key 50 with the other stop shoulder 49, whereupon the apparatus can be elevated in the well bore, the clutch teeth 42, 43 coengaging and coupling the body 10 through the segment 38 to the clutch sleeve 28 and clutch housing 33, which is connected to the drag body 36. The entire apparatus is now elevated in the well casing C, and may be removed entirely therefrom, the drag blocks 58 sliding frictionally against the wall of the well casing during such elevation of the apparatus.

It is, thus, apparent that a friction drag device A has been provided which is capable of manufacture in a much simpler manner and in much less time. The device requires less parts and is simpler to assemble in view of the minimum number of parts. Adequate guiding of the drag block 58 is furnished by the longitudinal grooves 57.

The inventor claims:

1. In a drag assembly adapted to be lowered in a well bore: a body member having a circumferential groove extending completely therearound; circumferentially spaced longitudinally extending grooves in said body member on one side of and opening into said circumferential groove; circumferentially spaced drag members movable in said longitudinally extending grooves and circumferential groove and projecting laterally outwardly of said body member; means for urging said drag member in a direction laterally outwardly of said body member; said body member having a circumferential recess extending completely therearound and disposed on the other side of said circumferential groove and receiving portions of said drag members at one end thereof, the outer side of said body member defining said recess constituting stop means engageable by said end portions; and means on said body member overlying portions of said drag member at the other end thereof and engageable therewith to limit the extent of movement of said drag members outwardly of said body member.

2. In a drag assembly adapted to be lowered in a well bore: a body member having upper and lower circumferential grooves extending completely therearound; said body member having circumferentially spaced longitudinally extending grooves between and opening into said circumferential grooves; circumferentially spaced drag members movable in said longitudinally extending grooves and circumferential grooves and projecting laterally outwardly of said body member; means for urging said drag members in a direction laterally outwardly of said body member; and stop means on said body member adjacent to said circumferential grooves and overlying portions of said drag members therein and engageable with such portions to limit the extent of movement of said drag members outwardly of said body member.

3. In a drag assembly adapted to be lowered in a well bore: a body member having upper and lower circumferential grooves extending completely therearound; said body member having circumferentially spaced longitudinally extending grooves between and opening into said circumferential grooves; circumferentially spaced drag blocks slidably mounted in said longitudinally extending grooves and circumferential grooves and projecting laterally outwardly of said body member; spring means engaging said body member and blocks for urging said blocks in a direction laterally outwardly of said body member; said body having a circumferential recess extending completely therearound and opening into one of said circumferential grooves and receiving portions of said blocks at one end of said blocks, the outer side of said body defining said recess constituting a stop ring engageable by said end portions of said blocks; and means on said body member overlying portions of said blocks at the other end thereof and engageable therewith to limit the extent of movement of said blocks outwardly of said body member.

4. In a drag assembly adapted to be lowered in a well bore: a body member having upper and lower circumferential grooves extending completely therearound; said body member having circumferentially spaced longitudinally extending grooves between and opening into said circumferential grooves; circumferentially spaced drag blocks slidably mounted in said longitudinally extending grooves and circumferential grooves and projecting laterally outwardly of said body member; spring means engaging said body member and blocks for urging said blocks in a direction laterally outwardly of said body member; said body having a circumferential recess extending completely therearound and opening into one of said circumferential grooves and receiving portions of said blocks at one end of said blocks, the outer side of said body defining said recess constituting a stop ring engageable by said end portions of said blocks; and a stop ring secured to said body member extending across the other of said circumferential grooves and being engageable by portions of said blocks at the other end of said blocks to limit the extent of movement of said blocks outwardly of said body member.

References Cited in the file of this patent

UNITED STATES PATENTS

| | | |
|---|---|---|
| 1,626,162 | Simons et al. | Apr. 26, 1927 |
| 2,280,076 | Mullinix | Apr. 21, 1942 |
| 2,639,773 | Webber | May 26, 1953 |
| 2,689,612 | Sawyer | Sept. 21, 1954 |
| 2,716,457 | Le Rouax | Aug. 30, 1955 |